July 2, 1929. R. S. BARTLETT ET AL 1,719,527
INCUBATOR HEATER
Filed Dec. 14, 1927   2 Sheets-Sheet 1
Fig. 1.
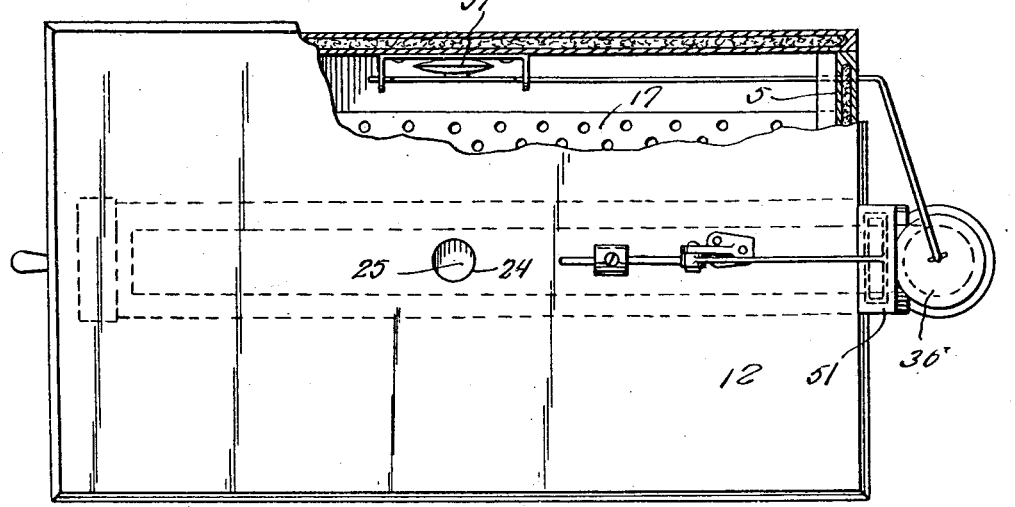
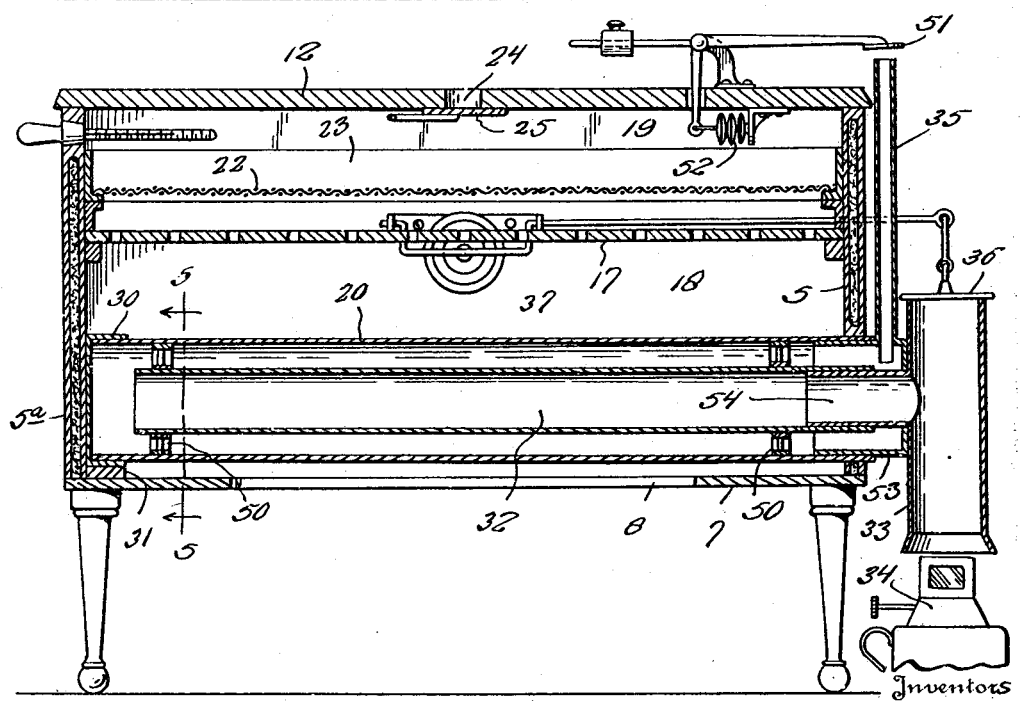
Fig. 2.
Inventors
R. S. Bartlett,
C. D. Harrison,
P. D. Lindsey,
By J. Stanley Burch
Attorney July 2, 1929.  R. S. BARTLETT ET AL  1,719,527
INCUBATOR HEATER
Filed Dec. 14, 1927  2 Sheets-Sheet 2
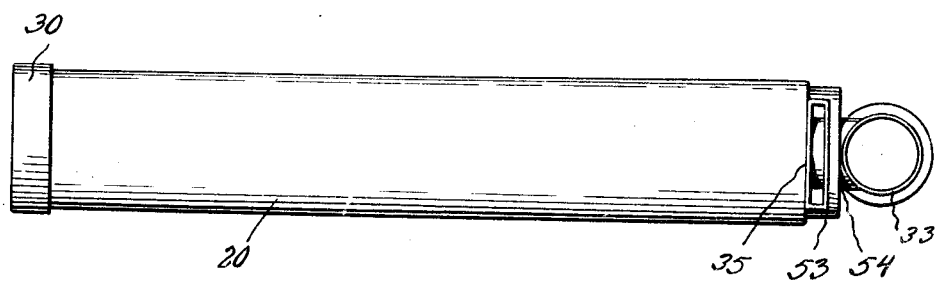
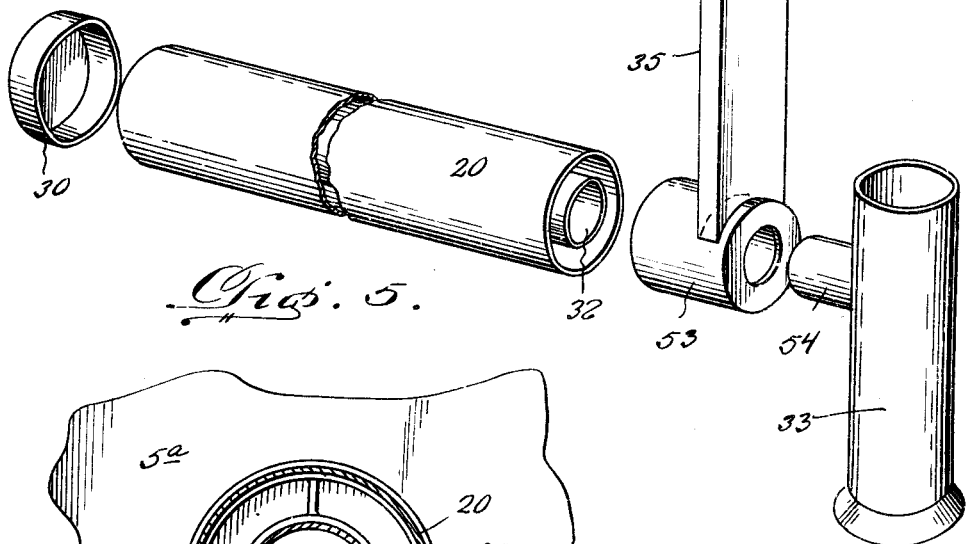
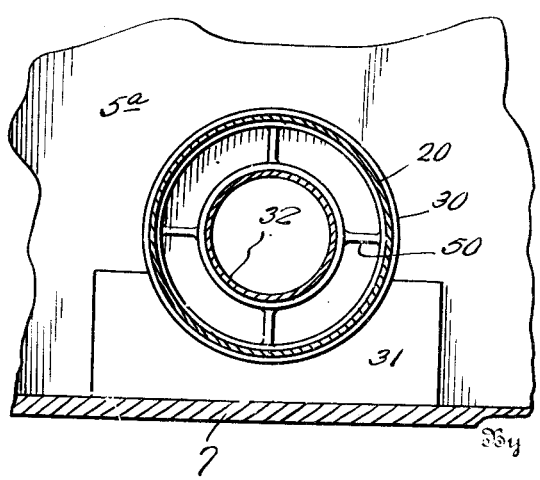

Patented July 2, 1929.

1,719,527

UNITED STATES PATENT OFFICE.

ROBERT S. BARTLETT, CHARLES D. HARRISON, AND PARREN D. LINDSEY, OF HOMINY, OKLAHOMA.

INCUBATOR HEATER.

Application filed December 14, 1927. Serial No. 239,890.

This invention relates to incubators, and has more particular reference to an improved form of heater for incubators of the type shown in our co-pending application, Serial No. 239,977, filed December 14, 1927.

The primary object of the present invention is to provide improved heating means for incubators having a lower heating chamber provided with a bottom cold air inlet and an upper incubating chamber provided with a top ventilator or hot air outlet, and wherein the egg tray has a foraminous bottom so that fresh air is substantially constantly heated and passed upwardly through the incubator body, past the eggs, for effectively and uniformly heating all of the eggs in the tray.

A more specific object is to provide an incubator heater which is so constructed as to effect thorough heating of the air circulated past the heating drum thereof, and wherein the construction is extremely simple and durable.

Still another object is to provide for the convenient manufacture and assembly of the heater, as well as to facilitate removal of parts for cleaning or repair.

The invention consists in the novel form, combination and arrangement of parts hereinafter more fully described, shown in the accompanying drawings and claimed.

In the drawings:—

Figure 1 is a top plan view, partly broken away and in section, of an incubator provided with heating means constructed in accordance with the present invention.

Figure 2 is a central vertical longitudinal section thereof.

Figure 3 is a top plan view of the heater.

Figure 4 is a developed perspective view of the heater, partly broken away, and

Figure 5 is an enlarged fragmentary section on line 5—5 of Figure 2.

Referring more in detail to the drawings, the incubator body has a bottom wall 7 formed with an elongated central longitudinal cold air inlet slot or opening 8, and a top wall or lid 12 having a central hot air outlet or ventilator opening 24 controlled by a thermostatically operated damper 25, the interior of the incubator body being divided into a lower heating chamber 18 and an upper incubating chamber 19 by means of a longitudinal perforated hot air deflector plate 17. Suitably supported in the incubating chamber 19 is an egg tray or drawer 23 having a perforated or foraminous bottom 22.

The present heater embodies a heating drum 20 removably projecting through an opening in an end wall 5 of the incubator body and extending horizontally as well as centrally and longitudinally in the incubator body directly above the cold air inlet 8 and to the other end wall 5$^a$ of said incubator body. The inner end of the drum is provided with a removable cap 30 and is seated in a saddle 31 secured on the bottom wall 7 at the inner side of the wall 5$^a$. The lateral branch 32 of a chimney 33 is removably supported in spaced concentric relation to and within the drum 20 by means of removable spiders 50 fitted in the drum and having the chimney branch fitted therein. The chimney branch 32 enters the projecting outer end of the drum 20 and extends to a point adjacent the inner end of the latter, while the said drum has a top stack 35 at the outer end thereof. In use, a suitable burner 34 is placed beneath the lower end of the chimney 33, and the air and hot products of combustion which are prevented from escaping through the top of the chimney are diverted through the branch 32 for the full length of the heating drum 20, the same then passing back the full length of the drum about the branch 32 and finally escaping through the stack 35. In this way, the drum 20 is effectively heated so that the cold air entering the inlet 8 of the incubator body is thoroughly heated as it passes the opposite sides of said drum.

A damper 36 is provided to control the escape of hot air and products of combustion through the top of chimney 33, said damper being operatively connected to a thermostat 37 so that the same is automatically opened or closed when the temperature in the incubating chamber rises above or falls below a predetermined point, the degree of opening or closing of the damper being proportional to the degree of rise or fall of the temperature. In a like manner, a damper 51 controls the escape of the hot air and products of combustion through the top of stack 35, said damper 51 being operatively connected to a thermostat 52 arranged in the incubating chamber. The damper 51, however, is closed by the expansion of thermostat 52 and opened by the contraction thereof, the reverse of the actuation of damper 36 by the thermostat 37. In this way, the passage of air and products of combustion through the branch 32, drum 20 and stack 35 is restricted in proportion to the degree of opening of damper 36, so that a very positive heat regulation is insured by forcing all the air and products of combustion to pass directly through the chimney without heating the drum 20, that the opening of damper 36 will permit.

To facilitate manufacture, assembly and repair, the drum 20 preferably embodies a main section having a short removable outer end section 53 telescoped therein, and the branch 32 embodies a main section having a short section 54 removably fitted in the drum section 53 and telescoped in the said main branch section, as well as formed rigid with the chimney 33. The main branch section 32 may be readily placed in or removed from the main drum section 20, and the assembly of the other heater parts is clearly indicated in Figure 4.

It will be seen from the above that the present heating means is thoroughly reliable and efficient and embodies a heater which is simple and durable in construction as well as capable of ready manufacture, assembly or removal of parts.

Minor changes may be made without departing from the spirit and scope of the invention as claimed.

What we claim as new is:—

1. In an incubator, heating means comprising a heating drum closed at the inner end, a stack at and on top of the outer end of said heating drum, a burner chimney having a lateral branch disposed in spaced concentric relation to said drum, said chimney branch projecting into the outer end of the drum and extending to a point adjacent the inner end of the latter, said heating drum embodying a main section having a removable outer end section telescoped therein, said stack being rigid with said outer end drum section, said chimney branch embodying a main section having a removable outer end section telescoped therein, said outer end branch section being removably fitted in the outer end drum section and being rigid with the chimney.

2. In an incubator, heating means comprising a heating drum closed at the inner end, a stack at and on top of the outer end of said heating drum, a burner chimney having a lateral branch disposed in spaced concentric relation to said drum, said chimney branch projecting into the outer end of the drum and extending to a point adjacent the inner end of the latter, a damper controlling the outlet of said stack a thermostat expansible for closing said damper, a second damper controlling the outlet of the chimney, and a second thermostat expansible for opening said second damper.

In testimony whereof we affix our signatures.

ROBERT S. BARTLETT.
CHARLES D. HARRISON.
PARREN D. LINDSEY.